United States Patent
Kato et al.

(10) Patent No.: US 9,660,952 B2
(45) Date of Patent: May 23, 2017

(54) COMPUTER READABLE NON-TRANSITORY MEDIUM, ELECTRONIC MAIL INFORMATION OUTPUT METHOD AND ELECTRONIC MAIL INFORMATION OUTPUT DEVICE

(71) Applicant: FUJITSU LIMITED, Kawasaki-shi, Kanagawa (JP)

(72) Inventors: Yoshitaka Kato, Kamitakai (JP); Masahiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 403 days.

(21) Appl. No.: 14/328,881

(22) Filed: Jul. 11, 2014

(65) Prior Publication Data
US 2014/0325008 A1 Oct. 30, 2014

Related U.S. Application Data

(63) Continuation of application No. PCT/JP2012/077463, filed on Oct. 24, 2012.

(30) Foreign Application Priority Data

Jan. 23, 2012 (JP) ................. 2012-011199

(51) Int. Cl.
*G06F 15/16* (2006.01)
*H04L 12/58* (2006.01)

(52) U.S. Cl.
CPC .............. *H04L 51/34* (2013.01); *H04L 51/30* (2013.01)

(58) Field of Classification Search
CPC . H04L 12/583; H04L 51/063; H04L 12/5885; H04L 51/34; H04L 51/16; H04L 12/586; H04L 12/588; H04L 67/24

(Continued)

(56) References Cited

U.S. PATENT DOCUMENTS

2004/0059787 A1 3/2004 Kawaguchi et al.
2004/0141004 A1* 7/2004 Cabezas ............... G06Q 10/107
715/751

(Continued)

FOREIGN PATENT DOCUMENTS

JP 10-313338 A 11/1998
JP 2001-337896 A 12/2001

(Continued)

OTHER PUBLICATIONS

Japanese Office Action dated Sep. 15, 2015 for corresponding Japanese Patent Application No. 2012-011199, with English Translation, 9 pages.

(Continued)

*Primary Examiner* — Ruolei Zong
(74) *Attorney, Agent, or Firm* — Fujitsu Patent Center

(57) ABSTRACT

A computer readable, non-transitory medium storing a program that causes a computer to execute a process, the process includes: storing identification information and information of a plurality of users of an electronic mail sent to the plurality of the users in a storage unit when receiving the electronic mail; determining whether a new electronic mail has a correlation with the electronic mail sent to the plurality of the users of which identification information is stored in the storage unit when receiving the new electronic mail; outputting information reporting receipt of the new electronic mail to at least one of the users included in the addresses of the electronic mail sent to the plurality of the addresses with reference to the storage unit when it is determined that the new electronic mail has the correlation with the electronic mail sent to the plurality of the users.

12 Claims, 24 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 2006/0248148 | A1* | 11/2006 | Timmins | G06Q 10/107 709/206 |
| 2007/0038715 | A1* | 2/2007 | Collins | G06Q 10/107 709/206 |
| 2007/0078973 | A1* | 4/2007 | Kussmaul | G06Q 10/107 709/224 |
| 2008/0168173 | A1* | 7/2008 | Munje | G06Q 10/107 709/228 |
| 2009/0193095 | A1* | 7/2009 | Coleman | H04L 12/5885 709/207 |
| 2011/0087744 | A1* | 4/2011 | Deluca | G06Q 10/107 709/206 |

FOREIGN PATENT DOCUMENTS

| | | |
|---|---|---|
| JP | 2002-055926 A | 2/2002 |
| JP | 2003-223403 A | 8/2003 |
| JP | 2005-346121 A | 12/2005 |
| JP | 2010-217994 A | 9/2010 |

OTHER PUBLICATIONS

International Search Report, mailed in connection with PCT/JP2012/077463 and mailed Nov. 20, 2012.

\* cited by examiner

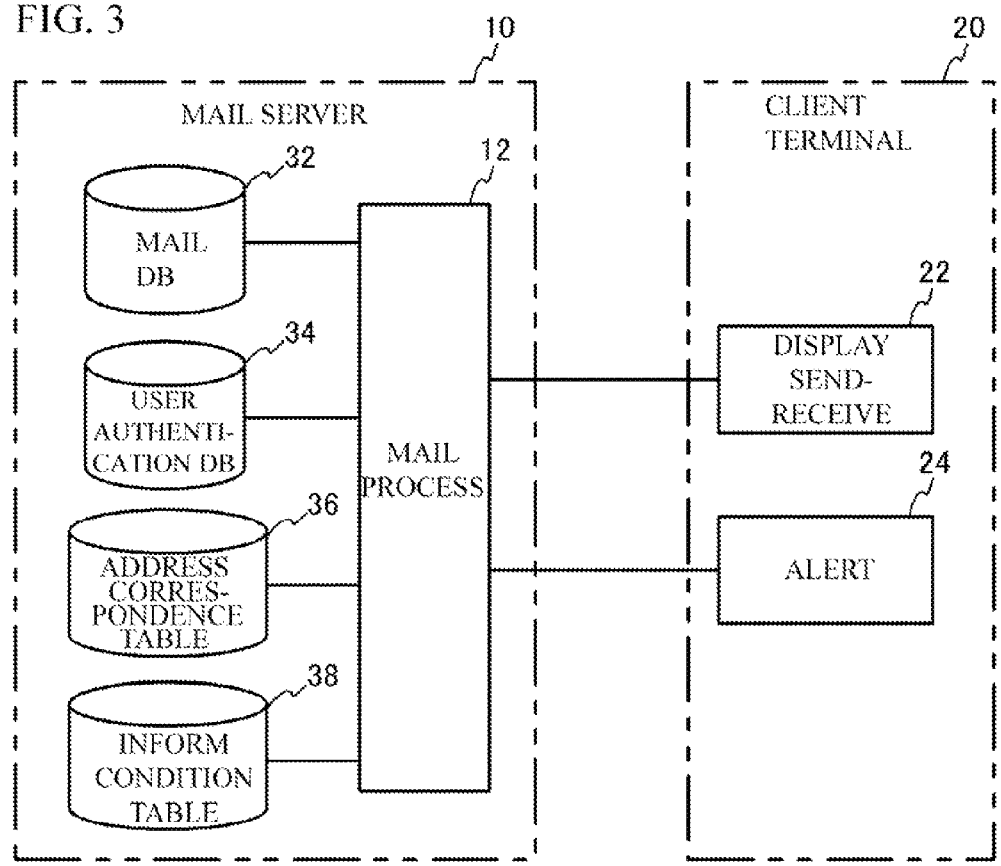

FIG. 4

<MAIL DB> 32

| USER ID | SEND-RECEIVE | MESSAGE ID | SENDER ID (USER ID) | OPEN | ADDRESS | SEND DATE | MAIL INFORMATION | |
|---|---|---|---|---|---|---|---|---|
| | | | | | | | SUBJECT | BODY TEXT |
| yamada@xxx.ww | RECEIVE | zumen4@xxx.ww | satou@xxx.ww | UN-READ | yamada@xxx.ww tanaka@xxx.ww | 2011/5/30 10:34:23 | Re:Re:Re: INVENTION | |
| | | shinnin@xxx.ww | suzuki@xxx.ww | READ | yamada@xxx.ww | 2011/5/30 9:42:32 | H.M. TEACHER | |
| | | zumen3@xxx.ww | tanaka@xxx.ww | READ | yamada@xxx.ww satou@xxx.ww | 2011/5/29 20:39:29 | Re:Re: INVENTION | |
| | | fuhou@xxx.ww | tanaka@xxx.ww | READ | yamada@xxx.ww | 2011/5/29 16:32:07 | CONDOLENCE | |
| | | zumen2@xxx.ww | satou@xxx.ww | UN-READ | tanaka@xxx.ww yamada@xxx.ww | 2011/5/29 11:27:01 | Re: INVENTION | |
| | | bousai@xxx.ww | tanaka@xxx.ww | READ | yamada@xxx.ww | 2011/5/29 10:03:09 | EMERGENCY DRILL | |
| | | Shinnen1@xxx.ww | suzuki@xxx.ww | READ | yamada@xxx.ww tanaka@xxx.ww | 2011/5/28 16:39:29 | NEW YEAR PARTY | |
| | SEND | Shinnen2@xxx.ww | yamada@xxx.ww | — | tanaka@xxx.ww | 2011/5/28 20:11:21 | Re: NEW YEAR PARTY | |

FIG. 5A

<USER AUTHENTICATION DB> 34

| USER ID | PASSWORD |
|---|---|
| yamada@xxx.ww | jjleriuth |
| tanaka@xxx.ww | ieuroitu |
| fujii@xxx.ww | lwkejrh |
| kuroda@xxx.ww | pouerj |
| koyama@xxx.ww | Poejro |

FIG. 5B

<ADDRESS CORRESPONDENCE TABLE> 36

| USER ID | IP ADDRESS |
|---|---|
| yamada@xxx.ww | XX.YYY.ZZZ.AAA |
| tanaka@xxx.ww | AA.BB.CCC.DDD |
| fujii@xxx.ww | XX.YYY.ZZA.BBB |
| kuroda@xxx.ww | AA.BB.CCS.DDD |
| koyama@xxx.ww | SS.EEE.DDD.WWW |

FIG. 5C

<INFORM CONDITION TABLE> 38

| MESSAGE ID | ADDRESS |
|---|---|
| qoiwuoeri@xxx.ww | yamada@xxx.ww, tanaka@xxx.ww, fujii@xxx.ww, kuroda@xxx.ww, koyama@xxx.ww, ooyama@xxx.ww, yamamoto@xxx.ww |

FIG. 10

| IN-FOLDER | NEW DOCUMENT | | | LOGOUT |
|---|---|---|---|---|
| | SENDER | DATE | SUBJECT | |
| | satou@xxx.ww | 2011/5/30 10:34:00 | Re: Re: Re: INVENTION | |
| | suzuki@xxx.ww | 2011/5/30 9:42:32 | NEW H.R. TEACHER | |
| | tanaka@xxx.ww | 2011/5/29 20:39:29 | Re: Re: INVENTION | |
| | tanaka@xxx.ww | 2011/5/29 16:32:07 | CONDOLENCE | |
| | satou@xxx.ww | 2011/5/29 11:27:01 | Re: INVENTION | |
| | tanaka@xxx.ww | 2011/5/29 10:03:09 | EMERGENCY DRILL | |
| | suzuki@xxx.ww | 2011/5/28 16:39:29 | NEW YEAR PARTY | |

FIG. 11

| IN-FOLDER | NEW DOCUMENT | | | LOGOUT |

| SENDER | DATE | SUBJECT |
|---|---|---|
| satou@xxx.ww | 2011/5/30 1... | REPLY ...NVENTION |
| suzuki@xxx.ww | 2011/5/30 9:4... | REPLY TO ALL ...EACHER |
| tanaka@xxx.ww | 2011/5/29 20... | ⋮ ...ENTION |
| tanaka@xxx.ww | 2011/5/29 16... | ...NCE |
| satou@xxx.ww | 2011/5/29 11... | ...ION |
| tanaka@xxx.ww | 2011/5/29 10:03:09 | EMERGENCY DRILL |
| suzuki@xxx.ww | 2011/5/28 16:39:29 | NEW YEAR PARTY |

FIG. 14

| MESSAGE CREATION SCREEN | SEND | SAVE | | LOGOUT |

ADDRESS [                    ]
CC      [                    ]
SUBJECT [                    ]

DOCUMENT ENTRY SCREEN
[                              ]

FIG. 16

| IN-FOLDER | NEW DOCUMENT | | LOGOUT |
|---|---|---|---|
| | SENDER | DATE | SUBJECT |
| | satou@xxx.ww | 201... | ...NTION |
| | suzuki@xxx.ww | 201... | ...HER |
| | tanaka@xxx.ww | 201... | ...ON |
| | tanaka@xxx.ww | 201... | |
| | satou@xxx.ww | 201... | INVENTION |
| | tanaka@xxx.ww | 2011/5/29 10:03:09 | EMERGENCY DRILL |
| | suzuki@xxx.ww | 2011/5/28 16:39:29 | NEW YEAR PARTY |

SUBJECT Re: Re: Re: INVENTION REPLY MAIL (SENDER: tanaka@xxx.ww) WITH RESPECT TO MAIL (SENDER: satou@xxx.ww) HAS BEEN SENT TO SERVER

FIG. 18

| MESSAGE CREATION SCREEN | SEND  SAVE  LOGOUT |
|---|---|
| | ADDRESS: satou@xxx.ww, tanaka@xxx.ww |
| | CC: |
| | SUBJECT: Re: Re: Re: INVENTION |
| | DOCUMENT ENTRY |
| | DEAR SATO AND TA... THAT PROGRAM IS |
| | >DEAR SATO |
| | >THIS IS TANAKA. |

REPLY MAIL HAS BEEN RECEIVED FROM BROADCAST MEMBER (satou@xxx.ww).

FIG. 19

| MESSAGE CREATION SCREEN | | | | |
|---|---|---|---|---|
| REPLY MAIL HAS BEEN RECEIVED FROM BROADCAST MEMBER (satou@xxx.ww). | SEND | SAVE | | LOGOUT |
| | ADDRESS | satou@xxx.ww, tanaka@xxx.ww | | |
| | CC | | | |
| | SUBJECT | Re: Re: Re: INVENTION | | |
| | DOCUMENT ENTRY | | | |
| | DEAR SATO AND TANAKA<br>THAT PROGRAM IS...<br><br>>DEAR SATO<br>>THIS IS TANAKA. | | | |

COMPUTER READABLE NON-TRANSITORY MEDIUM, ELECTRONIC MAIL INFORMATION OUTPUT METHOD AND ELECTRONIC MAIL INFORMATION OUTPUT DEVICE

CROSS-REFERENCE TO RELATED APPLICATION

This application is a continuation application of PCT/JP2012/077463 filed on Oct. 24, 2012, which claims priority to Japanese Patent Application No. 2012-011199 filed on Jan. 23, 2012, the contents of which are herein wholly incorporated by reference.

FIELD

A certain aspect of embodiments described herein relates to a computer readable non-transitory medium, an electronic mail information output method and an electronic mail information output device.

BACKGROUND

Normally, a user terminal that receives a mail from an electronic mail server sets a time interval for sending an electronic mail to and receiving an electronic mail from a user using the terminal in order to suppress increasing of traffic, sends a receipt requirement of newly received electronic mails to the electronic mail server at the interval, and receives electronic mails from the electronic mail server. In this case, the user using the terminal cannot recognize the newly received electronic mails until the electronic mail server and the user terminal communicate with each other next time. The time interval is various with respect to each user. A user of which number of received mail is small may set the time interval to 30 minutes to one hour. On the other hand, a user of which number of received mail is large may set the time interval to a few minutes. Therefore, there is variability among the time intervals of users.

Japanese Patent Application Publication No. 10-313338 discloses a technology in which a user sets a condition with respect to an electronic mail server in advance, the electronic mail servers informs the user terminal of arriving of an electronic mail when the electronic mail server receives an electronic mail having a condition corresponding to the condition.

SUMMARY

According to an aspect of the present invention, there is provided a computer readable, non-transitory medium storing a program that causes a computer to execute a process, the process comprising: storing identification information and information of a plurality of users of an electronic mail sent to the plurality of the users in a storage unit when receiving the electronic mail determining whether a new electronic mail has a correlation with the electronic mail sent to the plurality of the users of which identification information is stored in the storage unit when receiving the new electronic mail; outputting information reporting receipt of the new electronic mail to at least one of the users included in the addresses of the electronic mail sent to the plurality of the addresses with reference to the storage unit when it is determined that the new electronic mail has the correlation with the electronic mail sent to the plurality of the users.

According to another aspect of the present invention, there is provided an electronic mail information output method including: storing identification information and information of a plurality of users of an electronic mail sent to the plurality of the users in a storage unit when receiving the electronic mail: determining whether a new electronic mail has a correlation with the electronic mail sent to the plurality of the users of which identification information is stored in the storage unit when receiving the new electronic mail; outputting information reporting receipt of the new electronic mail to at least one of the users included in the addresses of the electronic mail sent to the plurality of the addresses with reference to the storage unit when it is determined that the new electronic mail has the correlation with the electronic mail sent to the plurality of the users.

According to another aspect of the present invention, there is provided an electronic mail information output device including: a memory; and a circuitry, wherein the memory is configured to store identification information and information of a plurality of users of an electronic sent to the plurality of the users; wherein the circuitry is configured: to determine whether a new electronic mail has a correlation with the electronic mail sent to the plurality of the users of which identification information is stored in the memory when receiving the new electronic mail; and to output information reporting receipt of the new electronic mail to at least one of the users included in the addresses of the electronic mail sent to the plurality of the addresses with reference to the memory when it is determined that the new electronic mail has the correlation with the electronic mail sent to the plurality of the users.

BRIEF DESCRIPTION OF DRAWINGS

FIG. 3 illustrates a function block diagram of a mail server and a client terminal;

FIG. 4 illustrates a data structure of a mail DB of FIG. 3;

FIG. 5A illustrates a data structure of a user authentication DB of FIG. 3;

FIG. 5B illustrates a data structure of an address correspondence table of FIG. 3;

FIG. 5C illustrates a data structure of an inform condition table of FIG. 3;

FIG. 10 illustrates an example of a mail-show-screen in accordance with the first embodiment;

FIG. 11 illustrates an example of a screen of a case where a user selects a reply or reply to all on the mail-show-screen of FIG. 10;

FIG. 14 illustrates an example of a message creation screen in accordance with the first embodiment;

FIG. 16 illustrates an example of pop up in accordance with the first embodiment;

FIG. 18 illustrates an example of pop up in accordance with the second embodiment;

FIG. 19 illustrates an example where information is inserted in a message creation screen in accordance with the second embodiment;

DESCRIPTION OF EMBODIMENTS

A user using an electronic mail may send an identical mail to a plurality of addresses (broadcast mail). A user receiving a broadcast mail may reply to a sender and all addresses included in the broadcast mail.

In this case, when the electronic mail server and each user terminal send and receive an electronic mail at a predetermined time interval as mentioned above, a user (A) receiving a broadcast mail may make a reply mail with respect to the broadcast mail without being aware of another reply mail with respect to the broadcast mail sent by another user (B). Therefore, the reply mail made by the user A may conflict with the reply mail made by the user B. The user A may send a reply mail ignoring a mind of the user B. In these cases, it is necessary for the user A, B to make a reply mail again.

With respect to this case, the above-mentioned problem is not considered conventionally. Therefore, when a reply mail with respect to a broadcast mail arrives, the electronic mail server cannot automatically inform the user of the arrival. Even if a condition is set so that an arrival of a reply mail with respect to a broadcast mail can be informed, it is necessary to set the condition with respect to each broadcast mail or each address. Therefore, a user spends a lot, and the setting is not realistic.

First Embodiment

Figure 1:
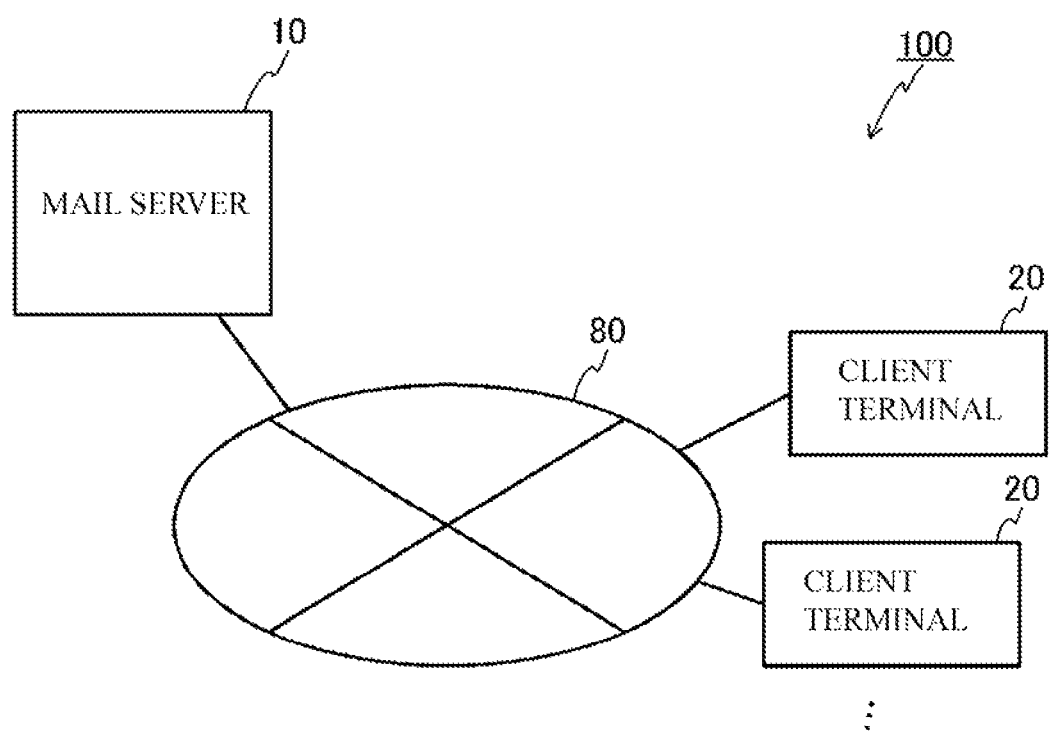
FIG. 1 illustrates a schematic view of an electronic mail system in accordance with a first embodiment.

A description will be given of a first embodiment of an electronic mail system with reference to FIG. 1 to FIG. 16 in detail. FIG. 1 illustrates a schematic view of a structure of the electronic mail system 100 in accordance with the first embodiment.

The electronic mail system 100 has a mail server 10 acting as an electronic mail information output device and a client terminal 20 as illustrated in FIG. 1. The mail server 10 and the client terminal 20 are coupled to a network 80 such as internet or a LAN. The electronic mail system 100 is a system in which a user performs inputting or operating with a web mail screen (provided by the mail server 10) shown on a browser in the client terminal 20 and thereby sending and receiving of an electronic mail can be allowed between the client terminals 20.

Figure 2A:
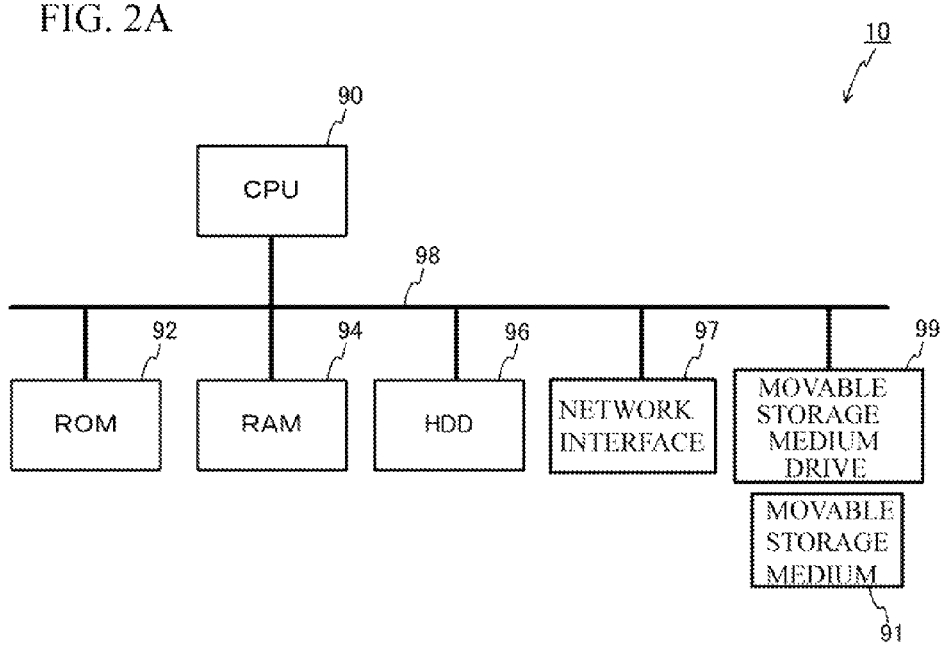
FIG. 2A illustrates a hardware structure of a mail server of FIG. 1.

FIG. 2A illustrates a hardware structure of the mail-server 10. As illustrated in FIG. 2A, the mail server 10 has a CPU (Central Processing Unit) 90, a ROM (Read Only Memory) 92, a RAM (Random Access Memory) 94, a storage unit (HDD) (Hard Disk Drive)) 96, a network interface 97, a movable storage medium drive 99 and so on. Each device of the mail server 10 is coupled to a bus 98. In the mail server 10, functions illustrated in FIG. 3 are realized when the CPU 90 executes a program stored in the ROM 92 or the HDD 96 (including electronic mail information output program) or a program (including electronic mail information output program) that the movable storage medium drive 99 reads from a movable storage medium 91.

Figure 2B:
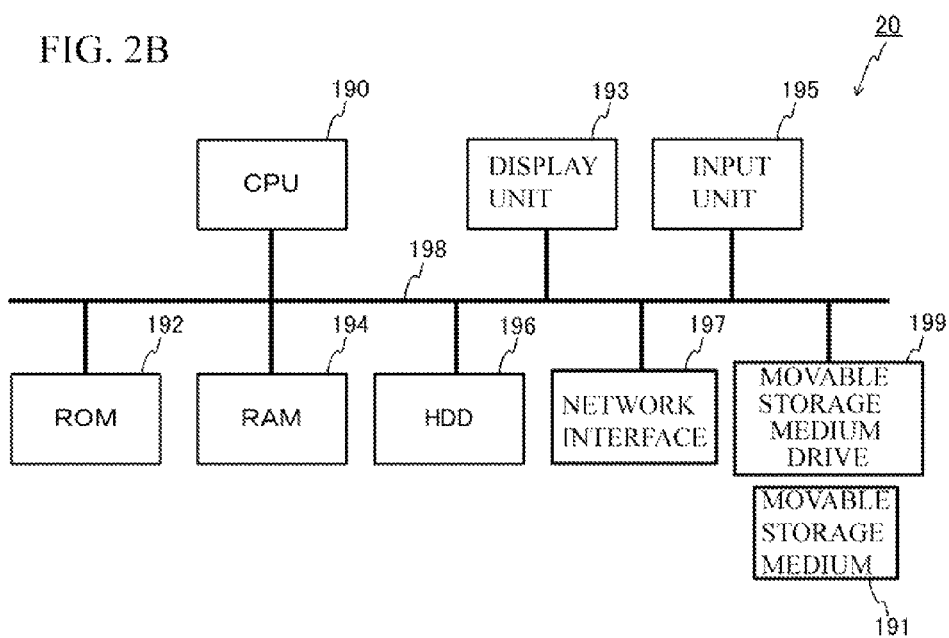
FIG. 2B illustrates a hardware structure of a client terminal of FIG. 1.

FIG. 2B illustrates a hardware structure of the client terminal 20. As illustrated in FIG. 2B, the client terminal 20 has a CPU 190, a ROM 192, a RAM 194, a storage unit (HDD) 196, a display unit 193, an input unit 195, a network interface 197, a movable storage medium drive 199 and so on. Each device of the client terminal 20 is coupled to a bus 198. In the client terminal 20, when the CPU 190 executes a program, the functions of FIG. 3 are realized.

FIG. 3 illustrates a function block diagram of the mail server 10 and the client terminal 20. As illustrated in FIG. 3, in the mail server 10, when the CPU 90 executes a program, a function as a mail process unit 12 is realized. And, in the client terminal 20, when the CPU 190 executes a program, functions as a display send-receive unit 22 and an alert unit 24 are realized. FIG. 3 also illustrates a mail DB 32 stored in the HDD 96 or the like of the mail server 10, a user authentication DB 34, an address correspondence table 36 and an information condition table 38 as a storage unit.

The mail process unit 12 makes a screen of a WEB mail, sends a screen to the client terminal 20, processes sending-receiving of a WEB mail and so on. And, the mail process unit 12 informs a plurality of addresses that one of the client terminals 20 of the addresses sends a reply with respect to a broadcast mail (electronic mail to a plurality of addresses) sent by one of the client terminals 20.

The display send-receive unit 22 shows the web mail screen sent by the mail process unit 12 on a browser and sends an instruction from a user (an instruction input on the browser) of the client terminal 20 to the mail server 10.

When the above-mentioned information is sent by the mail process unit 12, the alert unit 24 shows the information on the display unit 193 of the client terminal 20. A form of the display is described later.

The mail DB 32 is a database that stores information of an electronic mail sent and received between the client terminals 20 with respect to each user. The mail DB 32 has fields of "user ID", "send receive", "message ID", "sender ID (user ID)", "open condition", "address", "sending date", "mail information (subject and body text)". A user ID of a user performing sending and receiving of an electronic mail is input into the "user ID" field. When a folder is provided with respect to each user ID and the mail DB is located under the folder, the "user ID" field is not necessary. Whether the user sends the electronic mail or receives the electronic mail is input into the "send receive" field. A unique ID defined with respect to each electronic mail is input into the "message ID" field. A user ID of sending or receiving an electronic mail is input into the "sender ID (user ID)". When the "send receive" field is "send", the ID in the "user ID" field is input. When the "send receive" field is "receive", "read" meaning opened is input into the "open condition" field or "unread" meaning not opened is input into the "open condition" field. When the "send receive" field is "send", neither "read" nor "unread" is input (in FIG. 4 "-" is input). An address of an electronic mail is input into the "address" field. A sending date of an electronic mail is input into the "sending date" field. A subject and a body text are input into the "mail information (subject and body text)" field. "send" and "receive" are separated into different folders and the "send receive" field may be omitted. Accordingly the "sender ID" field and "open condition" field may be omitted in a mail DB in the "send" field.

Returning to FIG. 3, the user authentication DB 34 is a database that stores information used in a login of a user. The user ID and a password corresponding to the user ID are stored in the user authentication DB 34 as illustrated in FIG. 5A.

A user ID and an IP address corresponding to the user ID are stored in the address correspondence table 36 as illustrated in FIG. 5B.

The information condition table 38 stores a message ID of a broadcast mail and user IDs (mail addresses) of a sender and an address (addresses) of an electronic mail corresponding to the message ID.

Next, a description will be given of processes of the mail process unit 12, the display send-receive unit 22 and the alert unit 24 with reference to FIG. 6 to FIG. 16 in detail.

Figure 6:
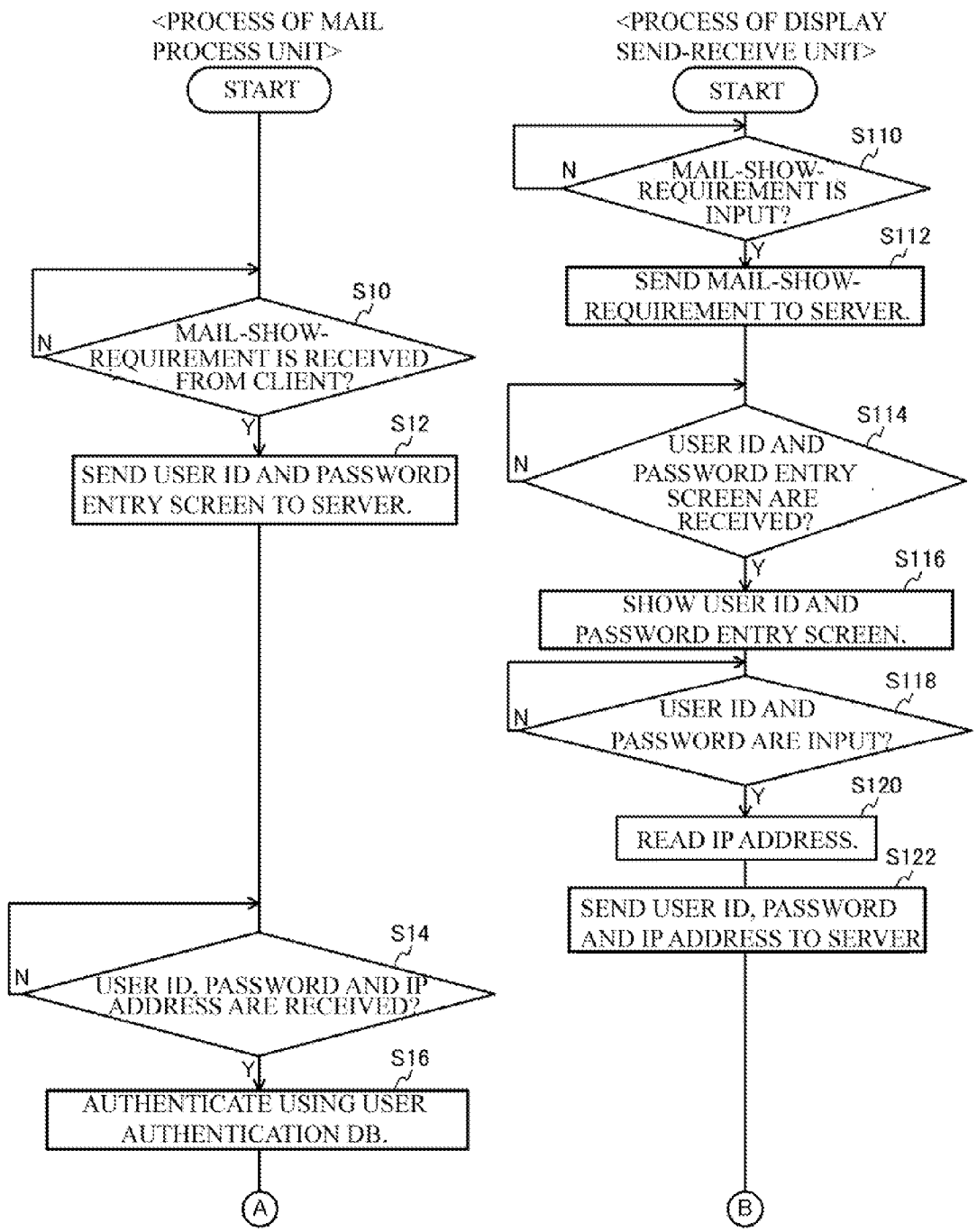
FIG. 6 illustrates a flowchart (part 1) of a sequential process of a mail process unit and a display send-receive unit in accordance with the first embodiment.
Figure 7:
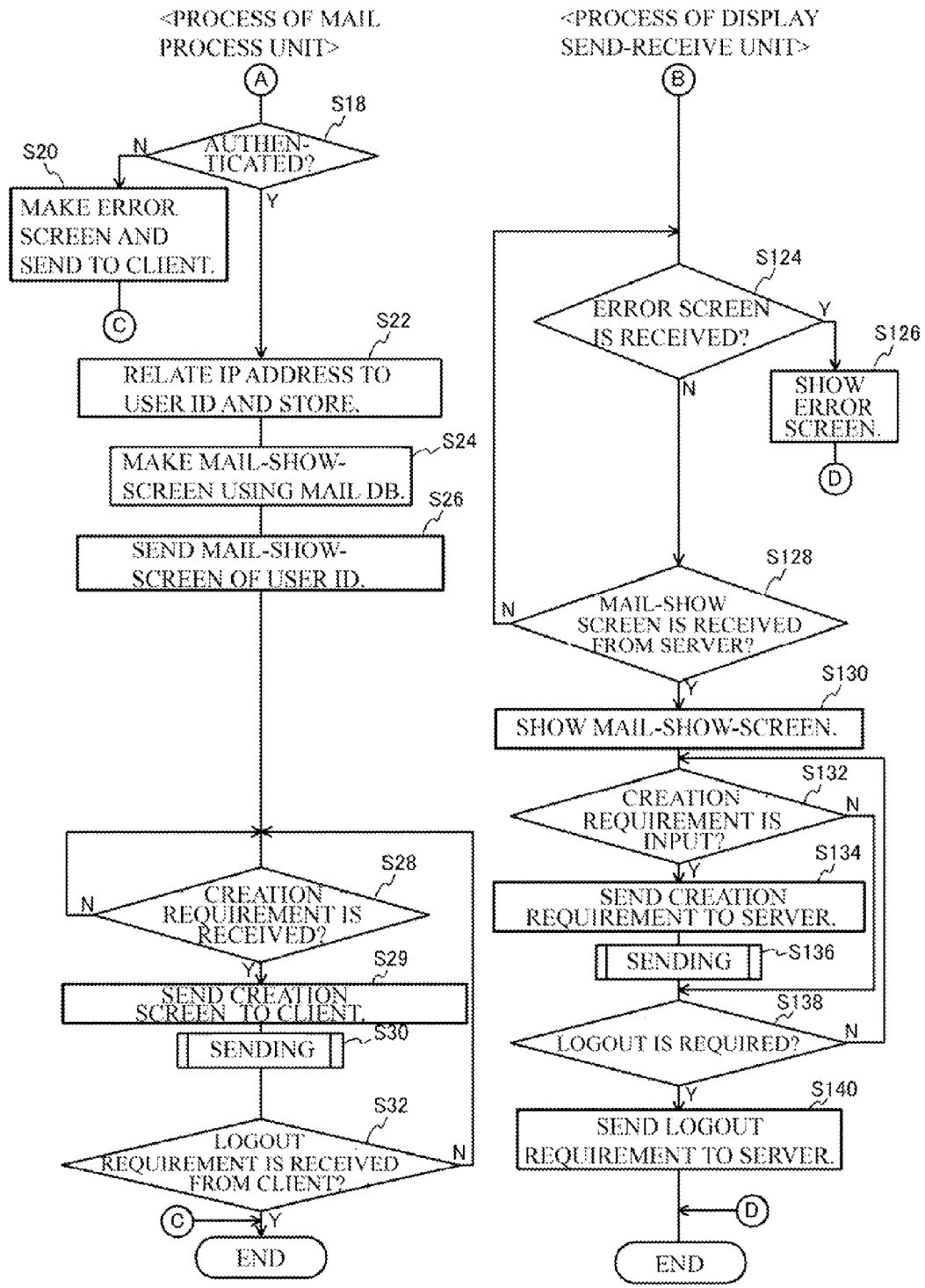
FIG. 7 illustrates the flowchart (part 2) of the sequential process of the mail process unit and the display send-receive unit in accordance with the first embodiment.

FIG. 6 and FIG. 7 illustrate a flowchart of a sequential flow of the processes of the mail process unit 12 in the mail server 10 and the display send-receive unit 22 in the client terminal 20. In the flowcharts of FIG. 6 and FIG. 7, each processing and each determining is located in view of a timing of the process by the mail process unit 12 and the display send-receive unit 22.

In the process of FIG. 6, in a Step S110, the display send-receive unit 22 holds it until show-requirement of an electronic mail is input into the display send-receive unit 22 from a user. The show-requirement is performed when the user accesses an address of a WEB mail on the browser. When it is determined as "Yes" in the Step S110, a step S112 is executed.

When the Step S112 is executed, the display send-receive unit 22 sends a mail-show-requirement to the mail server 10 (the mail process unit 12).

With respect to this case, in a Step S110, the mail process unit 12 holds it until the mail process unit 12 receives the mail-show-requirement from the client terminal 20 (the display send-receive unit 22). Therefore, the mail process unit 12 executes a Step S12 when the mail-show-requirement is sent from the display send-receive unit 22 in the Step S112.

Figure 8:
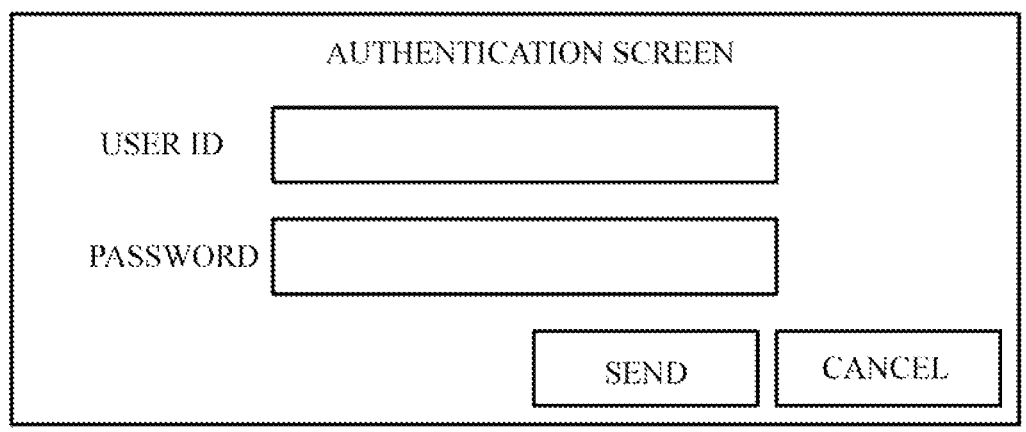
FIG. 8 illustrates an example of an authentication screen in accordance with the first embodiment.
Figure 9:
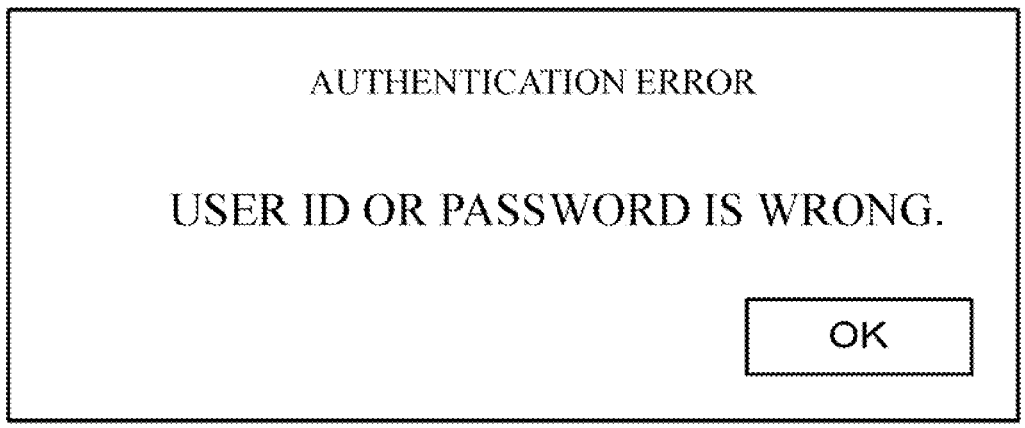
FIG. 9 illustrates an example of an authentication error screen in accordance with the first embodiment.

In the Step S12, the mail process unit 12 sends the user ID and an entry screen for inputting password to the client terminal 20 (the display send-receive unit 22). The entry screen is an authentication screen (a screen including input fields of the user ID and the password, a send button and a cancel button) as illustrated in FIG. 8.

On the other hand, in a Step S114 the display send-receive unit 22 holds it until the display send-receive unit 22 receives the user ID and password entry screen from the mail process unit 12 of the mail server 10 after the Step S112.

Therefore, the display send-receive unit 22 executes a Step S116 when the entry screen is sent from the mail server 10 side as mentioned above in the Step S12.

In the Step S116, the display send-receive unit 22 shows the user ID and the password entry screen (FIG. 8) on the display unit 193 (in a browser) of the client terminal 20. Next, in a Step S118, the display send-receive unit 22 holds it until a user ID and a password are input into the display send-receive unit 22. In this case, a Step S120 is executed when the user inputs a user ID and a password with use of the input unit 195 of the client terminal 20 and presses a send button.

When a Step S20 is executed, the display send-receive unit 22 obtains an IP address stored in the client terminal 20 as individual identification information of the client terminal 20. Next, in a Step S122, the display send-receive unit 22 sends the user ID, the password and the IP address to the mail server 10 (the mail process unit 12).

With respect to this case, the mail process unit 12 holds it until the user ID, the password and the IP address are sent from the client terminal 20 (the display send-receive unit 22) after the Step S12. Therefore, a Step S16 is executed when the user ID and so on are sent to the mail process unit 12 from the display send-receive unit 22 in the Step S122.

When the Step S16 is executed, the mail process unit 12 performs an authentication of the user with use of the sent user ID, the password, and the user authentication DB 34. After that, a Step S18 of FIG. 7 is executed.

When the Step S18 of FIG. 7 is executed, the mail process unit 12 determines whether the authentication is succeeded. When it is determined as "No", the mail process unit 12 makes an authentication error screen (FIG. 9) and sends the screen to the client terminal 20 (the display send-receive unit 22). All processes of FIG. 6 and FIG. 7 are terminated. On the other hand, when it is determined as "Yes" in the Step S18, a Step S22 is executed.

In the Step S22, the mail process unit 12 relates the IP address to the user ID and stores the IP address and the user ID in the address correspondence table 36. Next, in the Step S24, the mail process unit 12 uses the mail DB 32 and makes a mail-show-screen of the user ID. The mail-show-screen in this case is a screen illustrated in FIG. 10.

Next, in a Step S26, the mail process unit 12 sends the mail-show-screen (FIG. 10) of the user ID to the display send-receive unit 22 of the client terminal 20.

On the other hand, the display send-receive unit 22 holds it until the display send-receive unit 22 receives the authentication error screen from the mail server 10 (the mail process unit 12) or until the display send-receive unit 22 receives the mail-show-screen from the mail server 10 (the mail process unit 12) (S124, S128). Therefore, when the display send-receive unit 22 receives the authentication error screen from the mail process unit 12, it is determined as "Yes" in the Step S124 and a Step S126 is executed. In the Step S126, the display send-receive unit 22 shows the authentication error screen (FIG. 9) on the display unit 193 and after that all processes of FIG. 6 and FIG. 7 are terminated. On the other hand, when the display send-receive unit 22 receives the mail-show-screen (FIG. 10) from the mail process unit 12, a Step S130 is executed.

When the Step S130 is executed, the display send-receive unit 22 shows the mail-show-screen (FIG. 10) on the display unit 193 (in the browser) of the client terminal 20.

Next, in the Step S132, it is determined whether the message creation requirement is input. In this case, the message creation requirement is output when the user presses a new document button on the mail-show-screen or when a menu screen is shown by moving a cursor to a received mail and "reply" or "reply to all" is selected as illustrated in FIG. 11. A "reply" button or a "reply to all" button may be provided on the mail-show-screen in addition to the new document button, and it may be determined whether the message creation requirement is output in accordance with whether these buttons are pressed or not. A mail document related to a subject may be shown on the mail-show-screen when the subject shown on the mail-show-screen is clicked. A "reply" button and a "reply to all" button may be provided on a screen showing the mail document (not illustrated). It may be determined whether the message creation requirement is output based on whether these buttons are pressed or not. When it is determined as "No" in the Step S132, a Step S138 is executed. In the Step S138, it is determined whether a logout is required by the user (whether a logout button of FIG. 10 is pressed or not). When it is determined as "No" in the Step S138, the Step S132 is executed. On the other hand, when it is determined as "Yes" in the Step S132 (that is, the display send-receive unit 22 receives the message creation requirement), a Step S134 is executed.

In the Step S134, the display send-receive unit 22 sends the message creation requirement to the mail process unit 12 of the mail server 10. After that, a sending process sub routine (FIG. 12) of a Step S136 is executed.

With respect to this case, the mail process unit 12 holds it until the mail process unit 12 receives the message creation requirement from the client terminal 20 (the display send-receive unit 22) in the Step S28 after the Step S26. Therefore, it is determined as "Yes" in the Step S28 when the message creation requirement is sent from the display send-receive unit 22 in the above-mentioned Step S134. And a Step S29 is executed. In the Step S29, the mail process unit 12 sends the message creation screen (with reference to FIG. 14) to the display send-receive unit 22 of the client terminal 20. The mail process unit 12 sends the screen of FIG. 14 when the message creation requirement is "new document". The mail process unit 12 sends a screen in which a sender ID of an electronic mail extracted by the mail DB 32 is shown in the address field, and the subject and a cited document of a body text are shown in the subject field and document entry screen field (a subject to which "Re:" indicating a reply is added, and a body text to which ">" indicating cited is added). When the message creation requirement is "reply to all", the mail process unit 12 shows all sender IDs and all addresses (except for the user itself) of an electronic mail extracted from the mail DB 32 in the address field of the screen of FIG. 14 and sends a screen in which a subject and a cited document of a body text are shown in the subject field and the document entry screen field (a subject to which "Re:" indicating a reply is added, and a body text to which ">" indicating cited is added). When the process of the Step S29 is terminated, a sub routine of a sending process is executed in a next Step S30.

Next, a description will be given of a sending process by the display send-receive unit 22 and the mail process unit 12 along flowcharts of FIG. 12 and FIG. 13.

First, a description will be given of the sending process (a Step S136) along the flowchart of FIG. 12.

Figure 12:
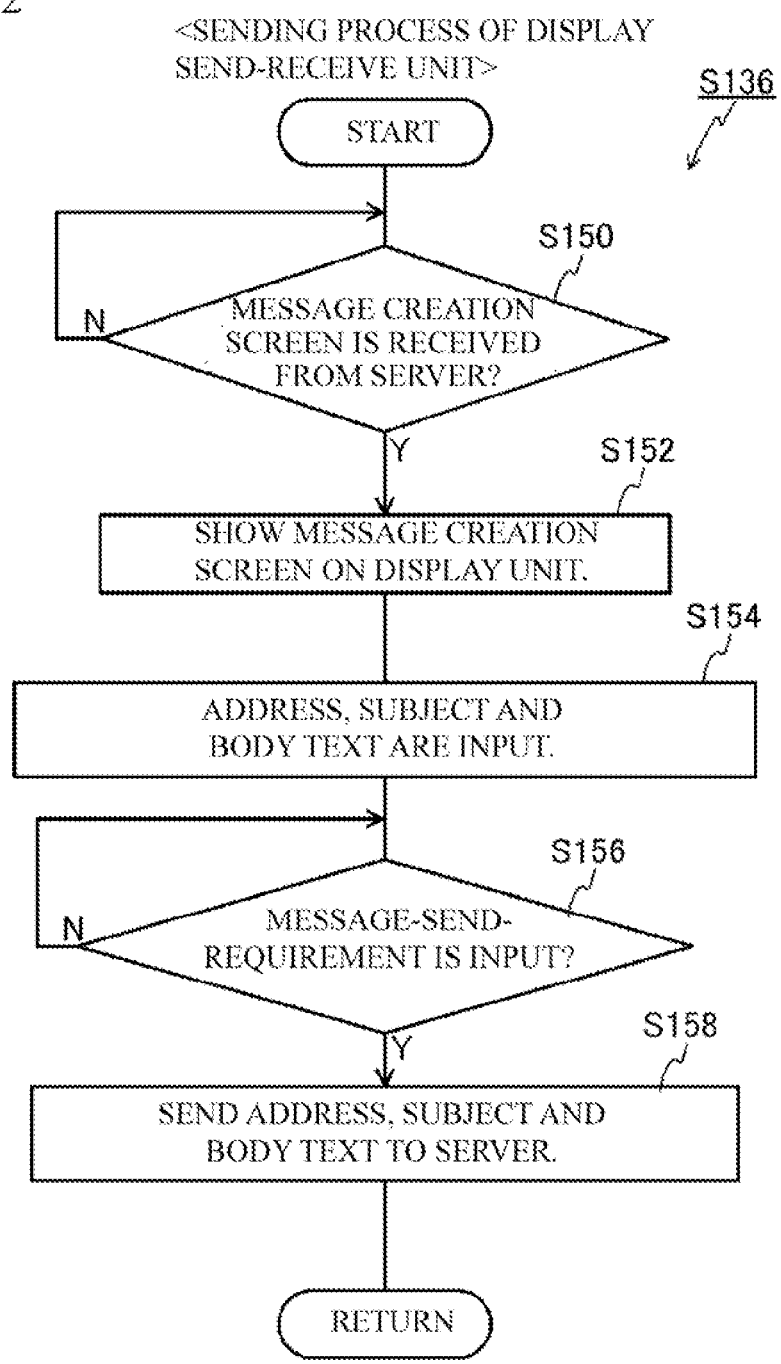
FIG. 12 illustrates details of a sending process by a display send-receive unit (Step S136) in accordance with the first embodiment.

In the process of FIG. 12, in a Step S150, the display send-receive unit 22 holds it until the display send-receive unit 22 receives the message creation screen from the mail server 10 (the mail process unit 12). In this case, when the message creation screen (FIG. 14) is sent from the mail process unit 12 in the Step S29 of FIG. 7 mentioned above, a Step S152 is executed.

When the Step S152 is executed, the display send-receive unit 22 shows the message creation screen of FIG. 14 received from the mail process unit 12 on the display unit 193 (in the browser).

Next, in the Step S154, an address, a subject and a document body are input into the display send-receive unit 22 by a user. Next, in a Step S156, the display send-receive unit 22 holds it until a message-send requirement is input. In this case, a message-send requirement is input into the display send-receive unit 22 when the user presses a send button in the screen of FIG. 14.

When the display send-receive unit 22 receives a message-send requirement from the user, a Step S158 is executed. And the display send-receive unit 22 sends an address, a subject and a document body to the mail process unit 12 of the mail server 10. After that, a Step S138 of FIG. 7 is executed.

Figure 13:
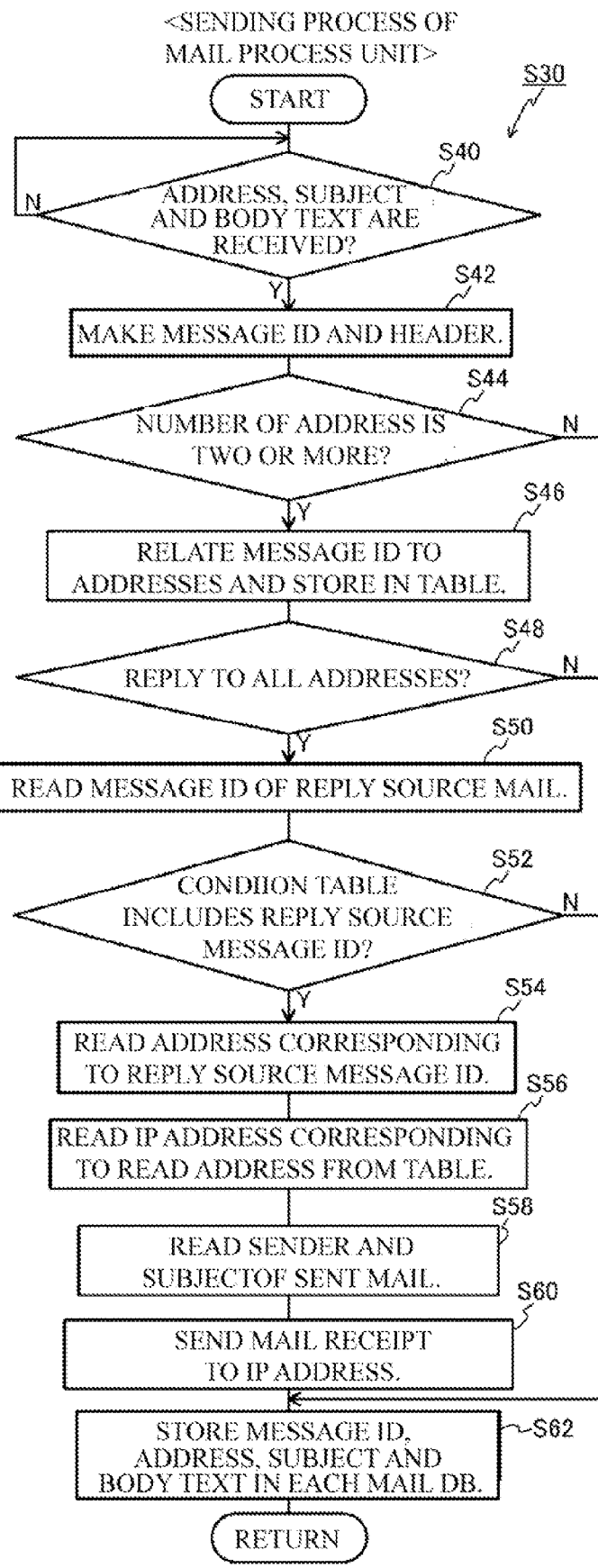
FIG. 13 illustrates details of a sending process by a mail process unit (Step S30) in accordance with the first embodiment.

With respect to this case, the mail process unit 12 holds it until the mail process unit 12 receives the address, the subject and the body text from the display send-receive unit 22 of the client terminal 20 in the Step S40 of FIG. 13 after the Step S29. Therefore, the mail process unit 12 executes a Step S42 at a timing when the process of Step S158 of FIG. 12 is executed.

When the Step S42 is executed, the mail process unit 12 makes a message ID and a header as identification information of an electronic mail with respect to the received address, the received subject matter and the received body text. Next, in a Step S44, it is determined whether an address of a sent mail includes a plurality of mail addressed. When it is determined as "No", a Step S62 is executed. On the other hand, when it is determined as "Yes", (that is, a plurality of addresses are included), a Step S46 is executed.

When the Step 46 is executed, the mail process unit 12 relates a message ID of the electronic mail to a plurality of mail addresses and additionally stores the message IDs and the mail addresses in the information condition table 38 (FIG. 5(c)). That is, when the mail process unit 12 receives the electronic mail having a plurality of addresses, identification information of the electronic mail (in the embodiment, a message ID) and information of a plural of users (in the embodiment, mail addresses) are stored in the information condition table 38. When the number of address is one, the Step S62 is executed after the Step S44. Therefore, the additional storing in the information condition table 38 is not performed.

Next, in the Step S48, it is determined whether a received electronic mail including a plurality of addresses is replied to all addresses with respect to another electronic mail (broadcast mail). When it is determined as "No", the Step S62 is executed. When it is determined as "Yes", a Step S50 is executed.

When the Step S50 is executed, the mail process unit 12 reads a message ID of a reply source mail. A message ID of the reply source mail can be read, when a mail is selected on a mail-show screen, a "reply" button or a "reply to all" button is pressed, an ID of the selected mail is stored in a memory or the like, and the ID is used. Next, in the Step S52, the mail process unit 12 determines whether the reply source message ID) is included in the information condition table 38. That is, the mail process unit 12 determines whether a newly received electronic mail (a reply mail to all with respect to the broadcast mail) has a correlation with an electronic mail of which message ID is already stored in the information condition table 38. When it is determined as "No" in the Step S52, the Step S62 is executed. When it is determined as "Yes" in the Step S52, the Step S54 is executed.

When the Step S54 is executed, the mail process unit 12 reads an address corresponding to the reply source message ID from the information condition table 38. Next, in the Step S56, the mail process unit 12 reads an IP address corresponding to the read address from the address correspondence table 36. Next, in the Step S58, the mail process unit 12 reads a sender and a subject of a sent mail from information sent from the client terminal 20.

And, in the Step S60, the mail process unit 12 informs the alert unit 24 in the client terminal 20 corresponding to the IP address read in the Step S56 of a mail receipt information together with the sender (user ID) and the subject matter. That is, the mail process unit 12 outputs information informing receipt of a newly received electronic mail (mail receipt information) to a user included in addresses of an electronic mail with reference to the information condition table 38 when the newly received electronic mail (a mail replied to all with respect to a broadcast mail) has a correlation with the electronic mail included in the information condition table 38. After that, the Step S62 is executed.

When the Step S62 is executed after the Step S60 or after it is determined as "No" in the Steps S44, S48 or S52, the mail process unit 12 stores the message ID, the address, the subject and the body text in the mail DB 32 of each address. After that, the Step S32 of FIG. 7 is executed.

With reference to FIG. 7, the display send-receive unit 22 determines whether logout is required in the Step S138 after the sending process of the Step S136. In this case, it is determined as "Yes" in the Step S138, when the user presses a logout button in a screen shown in the browser. When it is determined as "No" in the Step S138, the step S132 is executed. After that, the processes and determinations of the Step S132 to S138 are repeated until it is determined as "Yes" in the Step S138. On the other hand, when it is determined as "Yes" in the Step S138, a Step S140 is executed.

In the Step S140, the display send-receive unit 22 sends a requirement of logout to the mail process unit 12 of the mail server 10 and terminates all processes of the display send-receive unit 22 of FIG. 6 and FIG. 7.

With respect to this case, the mail process unit 12 determines whether the mail process unit 12 receives the requirement of logout from the display send-receive unit 22 of the client terminal 20 in the Step S32 after the sending process of the Step S30. When it is determined as "No", the Step S28 is executed. On the other hand, the mail process unit 12 terminates all processes of FIG. 6 and FIG. 7, because it is determined as "Yes" in the Step S32 when the display send-receive unit 22 executed the process of the Step S140.

Figure 15:
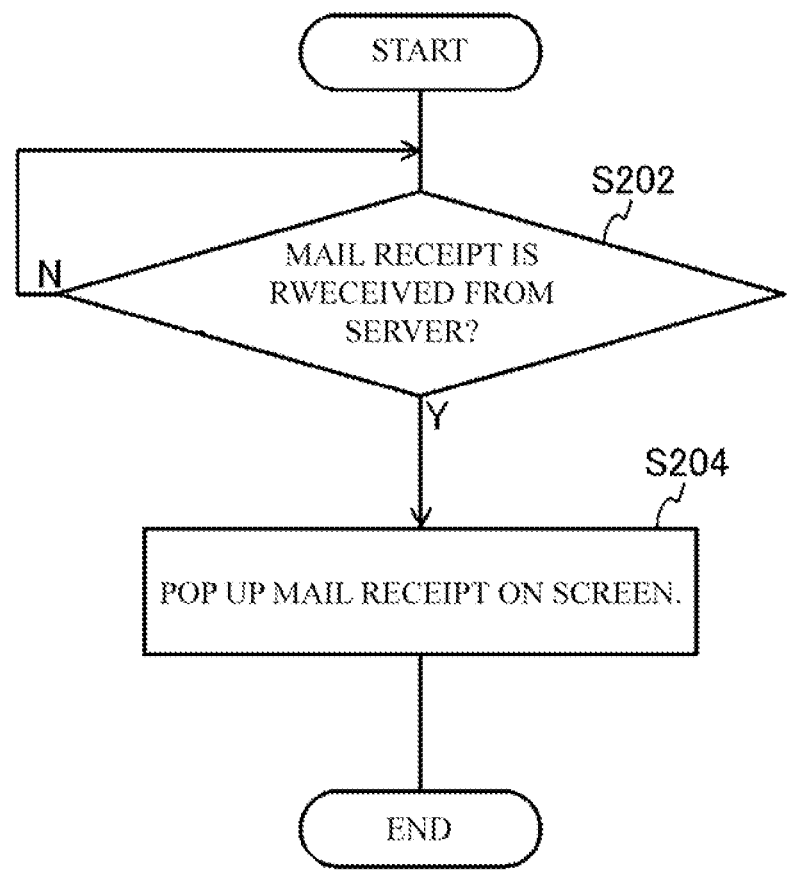
FIG. 15 illustrates a flowchart of a process of an alert unit in accordance with the first embodiment.

Next, a description will be given of the process of the alert unit 24 of the client terminal 20 with reference to FIG. 15. In the process of FIG. 15, in a Step S202, the alert unit 24 holds it until the alert unit 24 receives a mail receipt information from the mail process unit 12 of the mail server 10. In this case, when the mail receipt information is informed in the Step S60 of above-mentioned FIG. 13, a Step S204 is executed.

When the Step S204 is executed, the alert unit 24 pops up the mail receipt information on a screen of the display unit 193. For example, when a mail-show screen is shown on the display unit 193 as illustrated in FIG. 16, the alert unit 24 pops up a subject, information of a sender and so on of a reply mail with respect to a broadcast mail on a mail-show screen. In the embodiment, when a screen relating to an electronic mail is not shown on the display unit 193, a pop up illustrated in FIG. 16 is shown.

The processes of above-mentioned FIG. 6, FIG. 7 (FIG. 12 and FIG. 13) and FIG. 15 will be repeated even if the processes are terminated.

As mentioned above in detail, in accordance with the first embodiment, when the mail process unit 12 receives an electronic mail including a plurality of addresses (broadcast mail), the mail process unit 12 stores a message ID and the addresses in the information condition table 38 (S46). When the mail process unit 12 receives a new electronic mail, the mail process unit 12 determines whether the new electronic mail is a reply mail to all addresses with respect to the electronic mail (broadcast mail) of the message ID stored in the information condition table 38 (S44, S48 and S52). When it is determined as "Yes", the mail process unit 12 outputs (informs) a mail receipt information of the new electronic mail to the users (the client terminal 20) included in the addresses of the broadcast mail with reference to the information condition table 38 (S60). Thus, a receipt of the reply mail with respect to the broadcast mail is automatically sent to the users included in the addresses of the broadcast mail. Therefore, the receivers of the broadcast mail can acknowledge an existence of the reply mail by the mail receipt information when another receiver sends a reply mail to the broadcast mail. Therefore, in accordance with the embodiment, it is suppressed that a reply mail made by a receiver of the broadcast mail conflicts with a reply mail made by another receiver or the receiver of the broadcast mail sends a reply mail ignoring another receiver's mind. Therefore convenience of the users can be improved.

In the first embodiment, the mail process unit 12 reads an IP address in every user authentication (Step S22 (FIG. 7). Therefore, the mail process unit 12 can deal with a case where an IP address such as DHCP (Dynamic Host Configuration Protocol) is automatically assigned. And, the mail process unit 12 can deal with a case where a user uses a WEB mail with use of a different terminal.

Second Embodiment

Next, a description will be given of a second embodiment of an electronic mail system with reference to FIG. 17 to FIG. 19 in detail. In the second embodiment, being different from the first embodiment, when a reply mail to all addresses with respect to a broadcast mail is sent from another user at a timing when a user is making a reply mail with respect to the broadcast mail, a mail receipt information is shown. The second embodiment is different from the first embodiment only in a part of the process described in the first embodiment. A description will be given of this point. An explanation of the rest is omitted.

Figure 17:
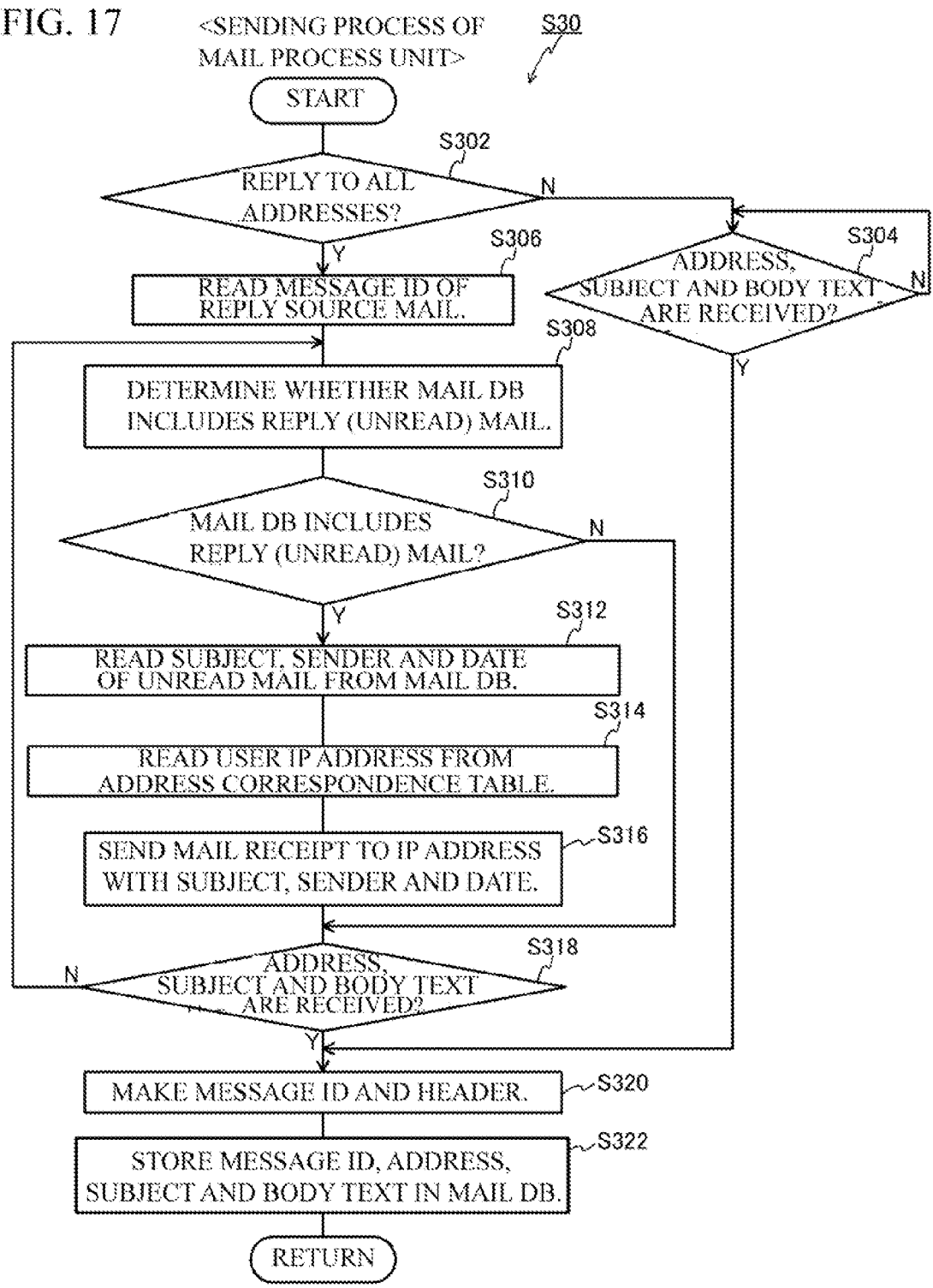
FIG. 17 illustrates a flowchart of a sending process (corresponding to Step S30 of FIG. 7) of a mail process unit in accordance with a second embodiment.

FIG. 17 illustrates a sending process of the mail process unit 12 in accordance with the second embodiment (corresponding to the Step S30 of FIG. 7). The processes of FIG. 6 and FIG. 7 are the same as the second embodiment. The process of FIG. 12 (the sending process of the display send-receive unit 22) is the same as the second embodiment.

In the process of FIG. 17, in the Step S302, the mail process unit 12 determines whether a message creation requirement indicates a reply to all with respect to another electronic mail in the Step S302. When it is determined as "No", a Step S304 is executed.

When the Step S304 is executed, the mail process unit 12 holds it until an address, a subject and a body text are received from the display send-receive unit 22 of the client terminal 20. In the Step S304, it is determined as "Yes" when the process of the Step S158 of FIG. 12 is performed. And, a Step S320 is executed (a process of the Step S320 will be described later).

On the other hand, when it is determined as "Yes" in the Step S302 (that is, a message creation requirement indicates a reply to all addresses with respect to another electronic mail), a Step S306 is executed.

When the Step S306 is executed, the mail process unit 12 reads a message ID of a reply source mail. Next, in a Step S308, the mail process unit 12 determines whether a reply (unread) mail is stored in the mail DB 32. That is, it is determined whether a reply mail from another user with respect to a broadcast mail to be replied is sent. When the determination is already performed, the Step S308 is not executed.

Next, in a Step S310, the mail process unit 12 determines whether the reply (unread) mail to the reply source mail is stored in the mail DB 32. When it is determined as "No", the Step S318 is executed. When it is determined as "Yes", the Step S312 is executed.

When the Step S312 is executed, the mail process unit 12 reads a subject, a sender and a date of an unread mail from the mail DB 32.

Next, in a Step S314, the mail process unit 12 reads an IP address of a user from the address correspondence table 36. Next, in a Step S316, the mail process unit 12 informs IP addresses of the mail receipt information together with a subject, a sender and a date. The alert unit 24 of the client terminal 20 receiving the information performs the same process as FIG. 15, and thereby pops up the mail alert information illustrated in FIG. 18.

When a Step S318 is executed after the Step S316 or after it is determined as "No" in the Step S310, the mail process unit 12 determines whether the mail process unit 12 receives an address, a subject, and a body text from the display send-receive unit 22 of the client terminal 20. That is, the mail process unit 12 determines whether a user makes a reply mail with respect to a broadcast mail on a message creation screen and send the reply mail. When it is determined as "No", the Step S308 is executed. On the other hand, when it is determined as "Yes" in the Step S318, a Step S320 is executed.

When the Step S320 is executed after it is determined as "Yes" in the Step S318 or the Step S304, the mail process unit 12 makes a message ID and a header with respect to the received address, the received subject and the received body text. Next, in a Step S322, the mail process unit 12 stores the message ID, the address, the subject and the body text in the mail DB 32 of each address. With the processes, the sending process of the mail process unit 12 of the second embodiment is terminated.

As described above in detail, in accordance with the second embodiment, information of a new reply mail (mail receipt information) from another user included in addresses of a broadcast mail with respect to the broadcast mail is sent to a user making a reply mail with respect to the broadcast mail (S316). Thus, the mail receipt information is sent at a timing when a user is making a reply mail with respect to the broadcast mail. Therefore, the user can adequately refer to a reply mail of another user during making of the replay mail. Therefore, it is possible to suppress that a reply mail made by a user conflicts with a reply mail sent by another user more effectively than the first embodiment.

In the second embodiment, a description is given of the case where the alert unit 24 pops up a mail receipt information. The structure is not limited. For example, the mail process unit 12 may insert the mail receipt information in a message creation screen with an HTML format as illustrated in FIG. 19 and may send the message creation screen to the display send-receive unit 22. In this case, the process from the client terminal 20 to the alert unit 24 (the process of FIG. 15) may be omitted.

Third Embodiment

Next, a description will be given of an electronic mail system of a third embodiment with reference to FIG. 20 to FIG. 23. In the third embodiment, when the client terminal 20 reads a screen relating to an electronic mail made by the mail server 10 and the client terminal 20 executes a program of a mail client installed in advance being different from the case of showing in the browser (WEB mail), the client terminal 20 makes a screen based on information sent by the mail server 10 and shows the made screen.

Figure 20:
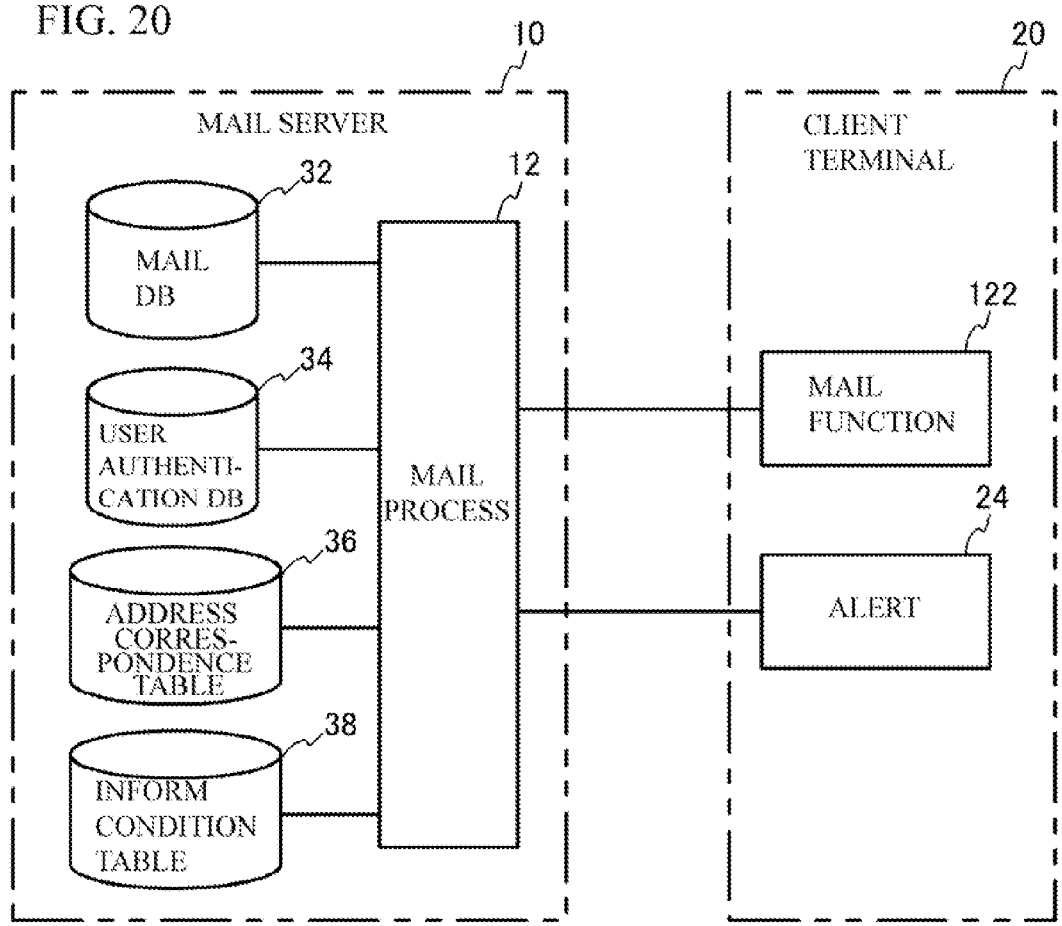
FIG. 20 illustrates a function block diagram of a mail server and a client terminal in accordance with a third embodiment.

In the client terminal 20 of the third embodiment, when the CPU 190 executes a program (mail client program), a mail function unit 122 and the alert unit 24 are realized as illustrated in FIG. 20. A description will be given of a process of the mail process unit 12 of the mail server 10 and a process of the mail function unit 122 and the alert unit 24 of the client terminal 20 with reference to FIG. 21 to FIG. 23. A part different from the first embodiment is mainly described below.

Figure 21:
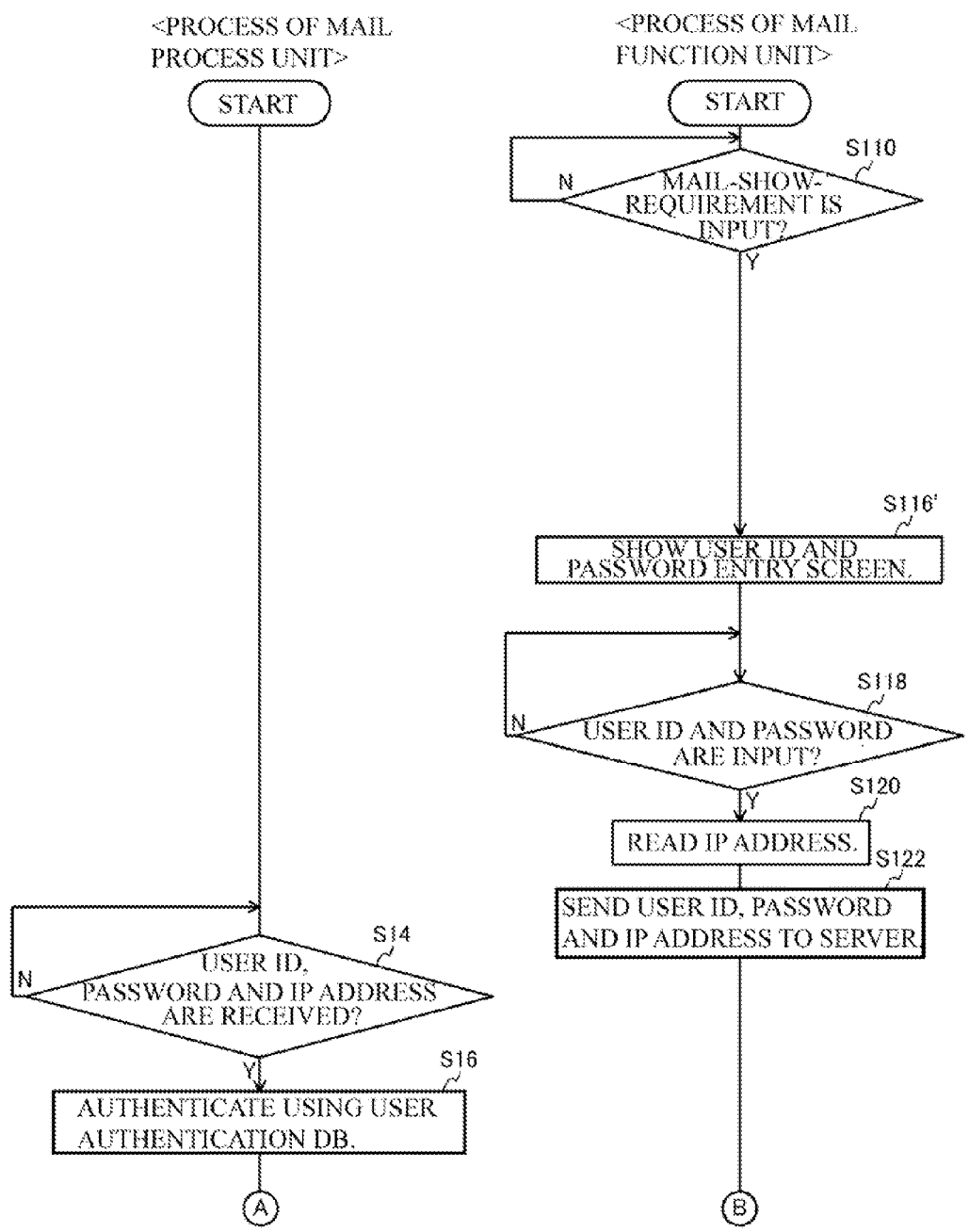
FIG. 21 illustrates a flowchart (part 1) of a sequential process of a mail process unit and a mail function unit in accordance with the third embodiment.
Figure 22:
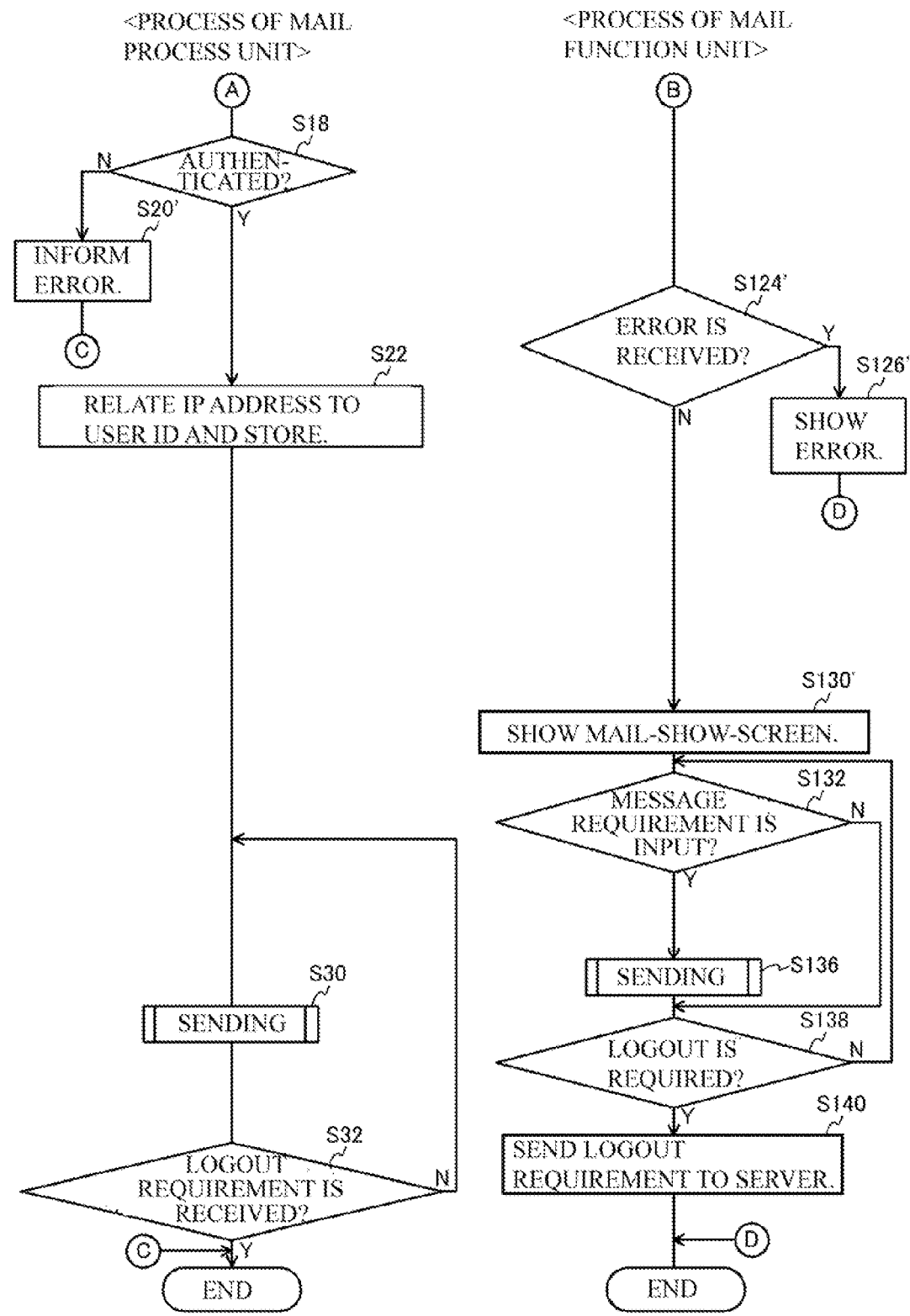
FIG. 22 illustrates the flowchart (part 2) of the sequential process of the mail process unit and the mail function unit in accordance with the third embodiment.
Figure 23:
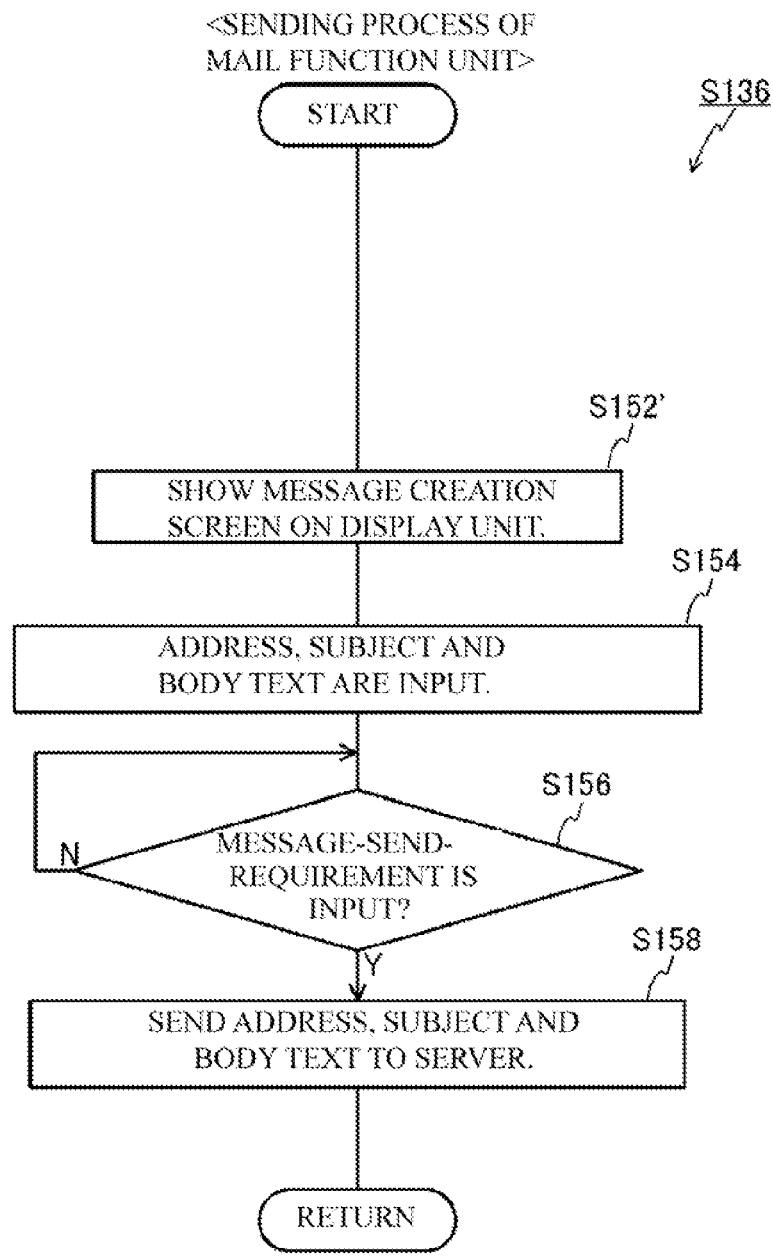
FIG. 23 illustrates a flowchart of a sending process of the mail function unit in accordance with the third embodiment.

FIG. 21 and FIG. 22 illustrate a flowchart (corresponding to FIG. 6 and FIG. 7 of the first embodiment) including a sequential process of the mail process unit 12 and the mail function unit 122 in accordance with the third embodiment.

In the process of FIG. 21, the mail function unit 122 shows a user ID and a password entry screen (the same as the screen of FIG. 8) in the Step S116 when a mail-show-requirement is input into the mail function unit 122 from a user in the Step S110. That is, in the third embodiment, the process of the Step S112 and S114 of the first embodiment (FIG. 6) is not performed. After that, the process of FIG. 22 is executed after the Step S118 to Step S122 are executed as in the case of the first embodiment.

With respect to this case, the mail process unit 12 does not execute the process of the Step S10 and S12 of the first embodiment but executes the process of the Step S14 and S16 (authentication process) and executes the process of FIG. 22.

When the process of FIG. 22 is executed, the mail process unit 12 determines whether the authentication is succeeded in the Step S18. When it is determined as "No", the mail process unit 12 gives an authentication error to the mail function unit 122 in a Step S20' and terminates all of the processes of FIG. 22. On the other hand, when it is determined as "Yes" in the Step S18, the mail process unit 12 executes the Step S22.

On the other hand, the mail function unit 122 determines whether the authentication error is received in a Step S124'. When it is determined as "Yes" in the Step S124', a Step S126' is executed, and the mail function unit 122 shows an authentication error screen (the same as the screen of FIG. 9) prepared in advance on the display unit 193.

On the other hand, when it is determined as "No" in the Step S124', a Step S130' is executed and a mail-show screen (the same as the screen of FIG. 10) is shown on the display unit 193. After that, the process of the Step S132 to the Step S140 is executed as in the case of the first embodiment (except for the Step S134 of FIG. 7). In the sending process of the Step S136, the mail function unit 122 executes the same process as the first embodiment except for not executing the Step S150 described with reference to FIG. 12 (the first embodiment) and showing the message creation screen (the same as the screen of FIG. 4) prepared in advance on the display unit 193 in the Step S152'.

With respect to this case, the mail process unit 12 executes the Steps S30 and S32 of FIG. 22 as in the case of the first embodiment (the Step S28 is omitted). The sending process by the mail process unit 12 of the mail server 10 is the same as the process of the first embodiment (FIG. 13).

The process of the alert unit 24 of the client terminal 20 is the same as the process of the first embodiment (FIG. 15). Therefore, the alert unit 24 pops up a mail receipt information on the display unit 193 of the client terminal 20 when the mail receipt information is informed by the mail process unit 12.

As mentioned above, in the third embodiment, even if a mail client is used, it is possible to inform all addresses of a broadcast mail that a reply mail to all addresses with respect to the broadcast mail is sent to the addresses of the broadcast mail as in the case of the first embodiment. Therefore, in accordance with the first embodiment, it is suppressed that a reply mail made by a receiver of the broadcast mail conflicts with a reply mail made by another receiver or the receiver of the broadcast mail sends a reply mail ignoring another receiver's mind. Therefore convenience of the users can be improved.

Modified Embodiment

Figure 24:
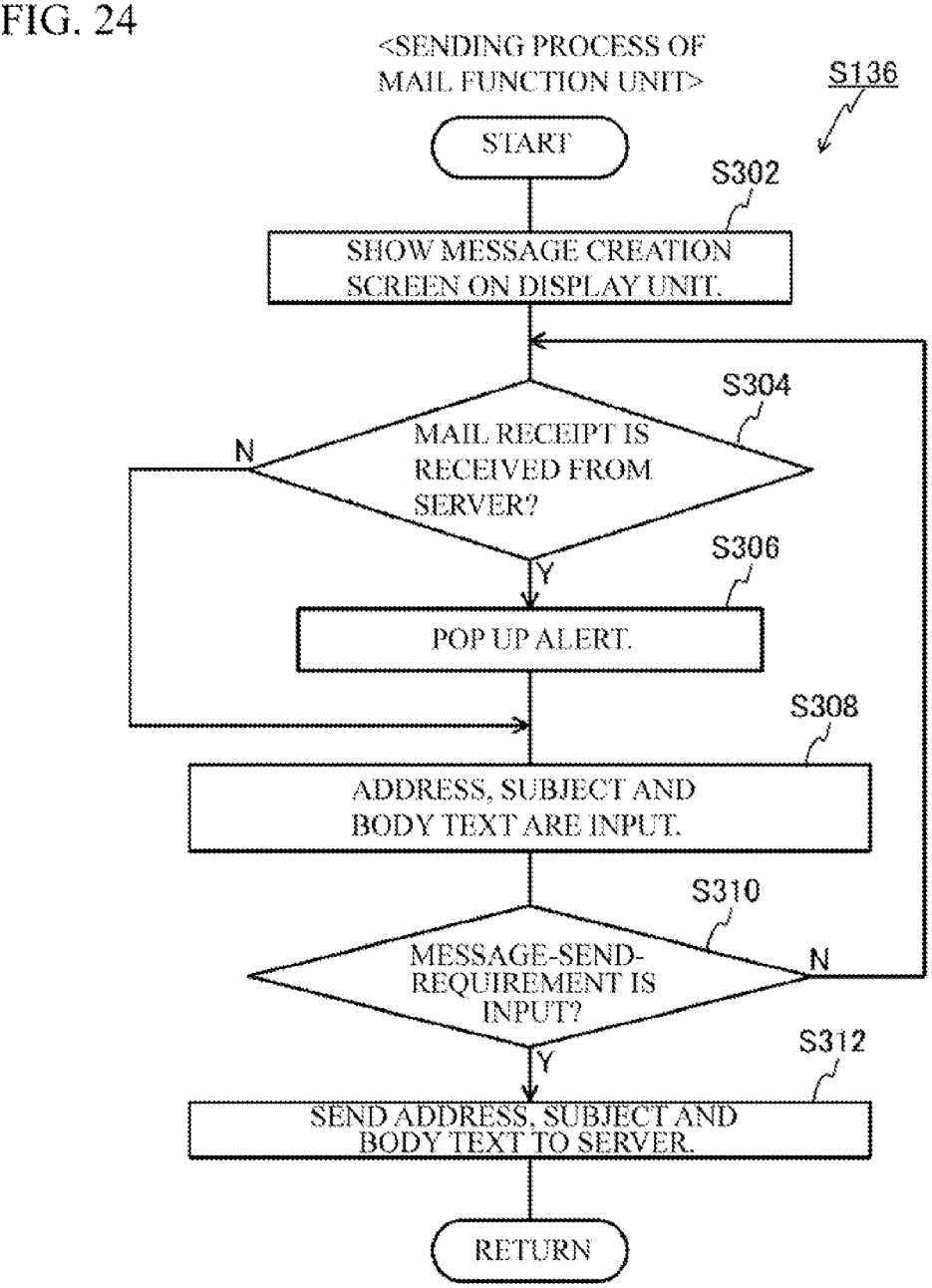
FIG. 24 illustrates a flowchart of a sending process of a mail function process in accordance with a modified embodiment.

In the third embodiment, the mail function unit 122 of the client terminal 20 may execute the process of FIG. 24 in the sending process (S136).

In the process of FIG. 24, when the mail function unit 122 shows a message creation screen on the display unit 193 in the Step S302, the mail function unit 122 determines whether the mail function unit 122 receives a mail receipt information from the mail process unit 12 of the mail server 10 in a next Step S304. When it is determined as "No", a Step S308 is executed and the mail function unit 122 receives an address, a subject and a body text from a user.

In a Step S310, the mail function unit 122 determines whether message-send-requirement is input into the mail function unit 122. When it is determined as "Yes", the mail function unit 122 sends the address, the subject and the body text to the mail process unit 12 of the mail server 10 in a Step S312. With respect to this case, when the message-send-requirement is not received, the Step S304 is executed.

On the other hand, when it is determined as "Yes" in the Step S304 (the information of receiving a mail is received), the mail function unit 122 pops up a new arrival information in the Step S306.

With the process, it is possible to inform a reply mail from another user with respect to a broadcast mail only when the message creation screen is shown on the display unit 193 of the client terminal 20 (that is, only when a user is making a new electronic mail). The mail function unit 122 may show a mail alert in the message creation screen in the Step S306 as in the case of the second embodiment. In the modified embodiment, the alert unit 24 can be omitted.

In the above-mentioned embodiments and the modified embodiment, an IP address is used as individual identification information of a terminal. However, the structure is not limited. For example, an individual number of a mobile phone such as a smart phone or information such as a telephone number may be used as the individual identification information.

In the embodiments, the mail process unit 12 performs informing of a mail receipt when a new reply mail to all addresses with respect to a broad cast mail is sent. However, the structure is not limited. For example, the mail process unit 12 may inform that a new mail relating to a broadcast mail is sent such as a reply mail other than a reply mail to all addresses with respect to the broadcast mail.

The above-mentioned functions are realized by a computer. In this case, a program having a process of a function which a process device should have is provided. When the computer executes the program, the above-mentioned functions are realized in the computer. The program having the process may be stored in a storage medium (except for a carrier wave) that is readable by the computer.

When the program is distributed, a movable storage medium such as a DVD (Digital Versatile Disc) or a CD-ROM (Compact Disc Read Only Memory) in which the program is stored are sold. And a storage device of a server computer may store the program, and the server computer may send the program to another computer via a network.

The computer executing a program stores a program stored in a movable storage medium or a program sent by the server computer in a storage device. And, the computer reads the program from the storage device, and executes processes in accordance with the program. The computer may read the program directly from the movable storage medium and executes a process in accordance with the program. The computer may execute a process in accordance with a received program sequentially each time when the program is sent from the server computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A computer readable, non-transitory medium storing a program that causes a computer to execute a process, the process comprising:

storing, upon receipt of an electronic mail that has been sent to a plurality of addresses, identification information of the electronic mail and information of the plurality of addresses of the electronic mail, in a storage unit;

determining, upon receipt of a new electronic mail, whether the new electronic mail has a correlation with the electronic mail that has been sent to the plurality of addresses of which identification information is stored in the storage unit;

outputting information reporting receipt of the new electronic mail to at least one of the plurality of addresses of the electronic mail that has been sent to the plurality of addresses with reference to the storage unit when it is determined that the new electronic mail has the correlation with the electronic mail that has been sent to the plurality of addresses.

2. The medium as claimed in claim 1, wherein in the outputting, information reporting receipt of the new electronic mail is output to an address of a user who is making a reply mail with respect to the electronic mail, the address of the user being included in the plurality of addresses of the electronic mail.

3. The medium as claimed in claim 1 wherein:
in the storing, individual identification information of a terminal users corresponding to the plurality of addresses use is stored as information of the users; and
in the outputting, information reporting receipt of the new electronic mail is sent to at least one of terminals the users use based on the individual identification information.

4. The medium as claimed in claim 1 wherein in the outputting, the new electronic mail is a reply mail with respect to the electronic mail that has been sent to the plurality of addresses, and the outputting is performed when the new electronic mail is an electronic mail of which addresses are a sender of the electronic mail that has been sent to the plurality of addresses and all of the plurality of addresses.

5. An electronic mail information output method comprising:
storing, upon receipt of an electronic mail that has been sent to a plurality of addresses, identification information of the electronic mail and information of the plurality of addresses of the electronic mail, in a storage unit;
determining, upon receipt of a new electronic mail, whether the new electronic mail has a correlation with the electronic mail that has been sent to the plurality of addresses of which identification information is stored in the storage unit;
outputting information reporting receipt of the new electronic mail to at least one of the plurality of addresses of the electronic mail that has been sent to the plurality of addresses with reference to the storage unit when it is determined that the new electronic mail has the correlation with the electronic mail that has been sent to the plurality of addresses.

6. The method as claimed in claim 5, wherein in the outputting, information reporting receipt of the new electronic mail is output to an address of a user who is making a reply mail with respect to the electronic mail, the address of the user being included in the plurality of addresses of the electronic mail.

7. The method as claimed in claim 5 wherein:
in the storing, individual identification information of a terminal users corresponding to the plurality of addresses use is stored as information of the users; and
in the outputting, information reporting receipt of the new electronic mail is sent to at least one of terminals the users use based on the individual identification information.

8. The method as claimed in claim 5 wherein in the outputting, the new electronic mail is a reply mail with respect to the electronic mail that has been sent to the plurality of addresses, and the outputting is performed when the new electronic mail is an electronic mail of which addresses are a sender of the electronic mail that has been sent to the plurality of addresses and all of the plurality of addresses.

9. An electronic mail information output device comprising:
a memory; and
a circuitry,
wherein the memory is configured to store, upon receipt of an electronic mail that has been sent to a plurality of addresses, identification information and information of the plurality of addresses of the electronic mail;
wherein the circuitry is configured:
to determine, upon receipt of a new electronic mail, whether the new electronic mail has a correlation with the electronic mail that has been sent to the plurality of addresses of which identification information is stored in the memory; and
to output information reporting receipt of the new electronic mail to at least one of the plurality of addresses of the electronic mail that has been sent to the plurality of addresses with reference to the memory when it is determined that the new electronic mail has the correlation with the electronic mail that has been sent to the plurality of addresses.

10. The electronic mail information output device as claimed in claim 9, wherein the circuitry is configured to output information reporting receipt of the new electronic mail to an address of a user who is making a reply mail with respect to the electronic mail, the address of the user being included in the plurality of addresses of the electronic mail.

11. The electronic mail information output device as claimed in claim 9 wherein:
the memory is configured to store individual identification information of a terminal users corresponding to the plurality of addresses use as information of the users; and
the circuitry is configured to send information reporting receipt of the new electronic mail to at least one of terminals the users use based on the individual identification information.

12. The electronic mail information output device as claimed in claim 9 wherein the circuitry is configured to perform the outputting of the information reporting receipt when the new electronic mail is a reply mail with respect to the electronic mail that has been sent to the plurality of addresses and the new electronic mail is an electronic mail of which addresses are a sender of the electronic mail that has been sent to the plurality of addresses and all of the plurality of addresses.

* * * * *